Feb. 24, 1959     G. LUGLI     2,874,742
PNEUMATIC VEHICLE WHEEL TIRES
Filed May 21, 1954
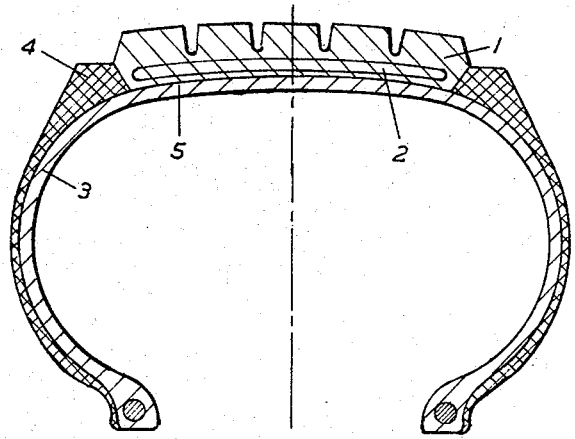
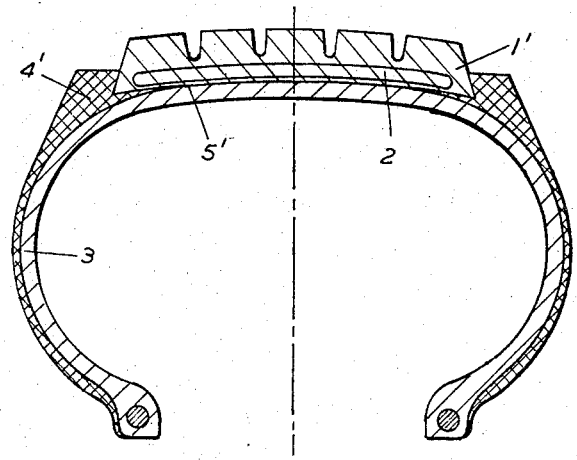
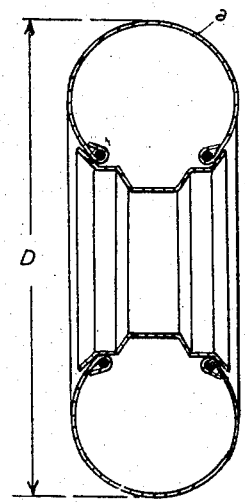 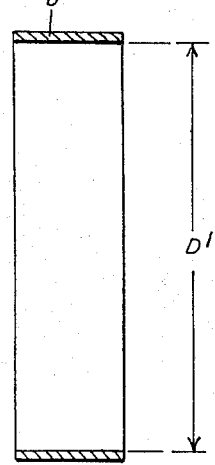 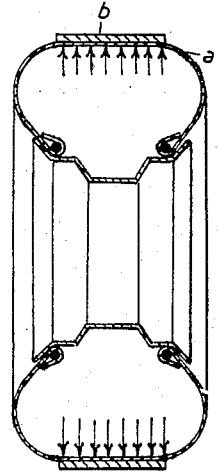

United States Patent Office 2,874,742
Patented Feb. 24, 1959

2,874,742

PNEUMATIC VEHICLE WHEEL TIRES

Giuseppe Lugli, Milan, Italy, assignor to Pirelli Societa per Azioni, Milan, Italy, a limited-liability company of Italy Application May 21, 1954, Serial No. 431,550

6 Claims. (Cl. 152—176)

This invention relates to pneumatic vehicle wheel tires of the type comprising a carcass-side wall unit and a tread unit detachably mounted thereon so as to be interchangeable with another similar unit when required whilst the first mentioned unit of the tire is still in good condition for service. For convenience the carcass-side wall unit of a tire of the foregoing type will hereinafter be referred to as the "casing unit" of the tire.

A number of constructions have been proposed for tires of the above mentioned type. All of the known constructions have, however, failed owing to the difficulty of efficiently anchoring the tread unit to the casing unit. The various forms of anchoring means, for example those employing grooves and those using tension rods, have failed to last a sufficient length of time owing to the very substantial stresses tangentially of the tire to which they are subjected in the use of the tire, said stresses, by reason of sudden braking of the vehicle and conversely sudden accelerations thereof, causing the tread unit to slide with respect to the casing unit of the tire. In addition the relative sliding movements as between tread unit and casing unit, although being very small, are nevertheless repeated in a cyclic manner at every turn of the wheel carrying the tire, with the result that in the aggregate they cause what is virtually continuous friction between the surfaces of contact of the tread unit on the one hand and the casing unit on the other. In addition, the tread unit over the area of compression contact with the ground tends to shrink in both longitudinal and transverse directions, and this again orginates in a very short time in friction and abrasion effects which so wear the said surfaces of contact as between the two units as to put the tire out of service.

The object of the present invention is to provide an improved construction of tire of the type referred to designed to eliminate the above mentioned shortcomings of the known constructions, the improvement concerning both the tread unit and also the casing unit of the tire, as will hereinafter appear.

According to the present invention, there is provided a pneumatic vehicle wheel tire with a replaceable tread, said tire comprising a casing unit and a tread unit detachably mounted thereon, said tread unit having a smooth inner periphery and consisting of a substantially cylindrical ring of rubber interiorly reinforced in a stratum of the ring near the inner periphery thereof with at least two superposed plies of substantially inextensible filiform reinforcing elements laid substantially parallel to the mid-circumferential plane of the tire whereby the ring is rendered substantially inextensible circumferentially; said casing unit having wheel rim engaging beads at the inner periphery of the unit and carrying on the outer periphery of the unit a smooth seating for the tread unit on which seating the tread unit seats uninterruptedly at all points along its inner periphery, said casing unit having a flattened cross-section when in the non-inflated condition and an external diameter at said seating when in said condition which is substantially equal to the internal diameter of the tread unit, said casing unit comprising a carcass portion consisting of at least one layer of substantially inextensible filiform reinforcing elements laid in the layer in planes which are substantially radial to the tire and contain the rotational axis thereof; said elements of said ring and similarly said elements of said carcass portion being embedded in a matrix of rubber completely separating them from one another, and the arrangement being such that the inflation pressure of the tire is effective to maintain the tread unit in non-slip engagement with the casing unit and by reason of the radial-plane disposition of the reinforcing elements of the casing unit, said casing unit, as regards a layer thereof in immediate adjacence to the tread unit seating, is yieldable longitudinally of said seating so as to elastically to move as one with the tread unit as the latter moves relatively to said beads under the working stresses in the tire, thus eliminating all creeping of the tread unit relatively to the casing unit in spite of the absence of any form of anchorage between the two.

By "rubber" in the sense in which this term is used herein and in the appended claims, is meant any natural or synthetic rubber or rubber-like material suitable for tire manufacture, and by filiform reinforcing elements is meant any twisted or braided formation of textile fibres suitable for the purposes of the invention, or in the case of a metal wire filiform reinforcing element either a single wire, e. g. of steel, or an assemblage of elementary wires twisted, braided or otherwise interwound with one another so as to form a unitary multi-wire structure.

Further according to the invention, in a case where the filiform reinforcing elements of the tread unit and/or the casing unit are metal wire elements composed of an assemblage of elementary wires as referred to above, the said wires are of a diameter greater than 0.20 mm., as in the tire forming the subject of my copending application Serial No. 316,356, now abandoned.

Further, according to the invention, the construction may be one wherein the tread unit seating is constituted by an annular recess in the periphery of the casing unit, in which recess a portion of the tread unit at the radially inner side thereof is received with a snug fit, the cross-sectional profile of said recess, in the non-inflated condition of the casing unit, corresponding to that of the tread unit as regards said portion thereof which is received within the recess, the rest of the tread unit projecting, at the edges of the unit, beyond the outer surface of the casing unit at the sides of the recess.

It is found that a tire constructed in accordance with the present invention is free from the disadvantages above mentioned of the known tires, its freedom therefrom being due to the fact that all possibility of relative movement between the two units of the tire, in any direction at all and even under the most severe conditions of abrupt braking or sudden accelerating, is positively eliminated, and this without the need to employ anchoring means or any particular shape for the contacting surfaces of the units; the positive non-slip hold of the casing unit is due, as will be understood, purely to the friction which obtains at the interface between the two units under the normal inflation pressure of the tire.

The invention will now be further described with reference to the accompanying drawings.

In these drawings:

Figure 1 is a substantially diagrammatic axial section through a wheel fitted with an untreaded casing unit inflated to a pressure equal to the normal working pressure of a complete tire comprising the casing unit shown in Figure 1 and a tread unit as shown diagrammatically in Figure 2 (which is an axial section through the unit) in position upon it;

Figure 3 is a substantially diagrammatic axial section through the wheel of Figure 1 with a complete tire as referred to with reference to Figures 1 and 2 in position upon it, said tire being inflated to said normal working pressure;

Figure 4 is a section through the complete tire of Figure 3, drawn on a larger scale than Figures 1 to 3, showing one possible construction as regards the shape of the recess hereinbefore referred to in the periphery of the casing unit of the tire in which the tread unit is received; and Figure 5 is a view similar to Figure 4, illustrating another possible construction in the foregoing regard, it being understood that the constructions illustrated in Figures 4 and 5 are constructions in accordance with the present invention.

Like reference characters are applied to like parts in the various figures.

Referring first to Figures 1 to 3, it will be seen that the casing unit of Figure 1, said casing unit being marked $a$, in the inflated condition thereof, has an over-all diameter of $D$, and the tread unit of Figure 2, which is marked $b$, an internal diameter of $D'$. If the tread unit be superimposed over the casing unit while the latter is in deflated condition and then the complete tire thus produced be inflated, the effect will be that which is illustrated in Figure 3; the inflating pressure being unable, owing to the intervention of the tread unit, to expand the casing unit radially, will cause the casing unit to expand axially of the tire, with the result that its cross-section becomes ovalised in the manner clearly shown in Figure 3.

Two particular conditions are, however, required in order that this state of affairs shall obtain:

(1) If the tread unit were composed solely of rubber it would stretch under the inflating pressure, with the result that the ovalising of the section of the casing unit (Figure 3) would not obtain, or at any rate would not be obtained to the same extent as it would be if the tread unit were completely inextensible. The tread unit must therefore be rendered inextensible by the incorporation of a reinforcement, the said reinforcement being adapted to withstand the maximum tensile stresses imposed in it by reason of the inflating pressure of the tire, with a certain margin of safety. In accordance with the statement of invention hereinbefore set forth such reinforcement consists, in a tire in accordance with the invention, of layers of textile fibre or metal wire filiform elements arranged in a particular manner. In the case of textile fibre elements, these may be composed for instance of rayon, cotton, nylon, hemp or flax, while in the case of metal wire elements, these may be composed of steel, bronze or aluminum.

(2) The casing unit must similarly have a structure as set out in the aforesaid statement of invention, according to which it comprises a number of layers of textile fibre or metal wire filiform elements similar to those employed for the reinforcement of the tread unit, these elements being again arranged in a particular manner as defined in the statement of invention and being completely separated from one another by thin layers of rubber intervening between them.

With such an arrangement any movement of the tread unit at the inner periphery thereof as the tire rotates in use is followed by the individual elements of the reinforcement of the casing unit, which therefore move with it without having to overcome any substantial resistance in doing so. In this way all causes of relative elementary sliding movement as between the two units of the tire, which would be cyclically repeated at each turn of the wheel carrying the tire, are therefore eliminated.

The casing unit of the tire should be shaped during vulcanisation of the unit in the mould in which it is formed in such a way that the unit has substantially the shape in cross-section in which it appears in the completed tire (Figures 3 and 4). In other words, the construction should be one in which the as-vulcanised shape of the casing unit is such that the seating thereon for the tread unit is cylindrical or nearly cylindrical in correspondence with the internal surface of the tread unit and is of a diameter which is substantially equal to that of said internal surface.

It is to be clearly understood that the respective arrangements of the reinforcing elements in the tread unit and the casing unit as hereinbefore set forth are interdependent upon one another in the sense that both are absolutely necessary to the attainment of the novel and advantageous effects which are inherent in the invention. In other words, these effects would not be obtained if either the one arrangement or the other were absent.

With further reference to Figures 4 and 5, it will be seen that the tread unit of the tire is marked 1 (Figure 4) or 1' (Figure 5), the reinforcement of the unit 2, the layers of rubberised elements forming the carcass portion of the casing unit 3 and the side wall portion of the casing unit 4 (Figure 4) or 4' (Figure 5), the tread unit being seated in an annular recess 5 (Figure 4) or 5' (Figure 5) in the periphery of the casing unit. The only difference between the two constructions of Figures 4 and 5 is that in the construction of Figure 4 the side walls of the recess are outwardly inclined, whereas in the construction of Figure 5 they are inwardly inclined, i. e. undercut. It is to be understood, however, that the particular shape of the recess in this respect is not very material and that the recess may have any desired shape consistent with practical requirements, more particularly as regards ease of assembling the tread unit relative to the casing unit and the converse operation of removing it therefrom. On the other hand it is highly important that, in accordance with the foregoing statement of invention, the bottom of the recess (i. e. in the non-inflated condition of the casing unit) shall be substantially cylindrical in correspondence with the inner periphery of the tread unit, and also of substantially the same diameter as said inner periphery, and further that the shape of the recess in cross-section shall be such as to ensure that in the inflated tire there is no gap between the sides of the recess and the edges of the tread unit.

It is advisable, although not absolutely necessary, that the surfaces in contact with one another of the tread unit on the one hand and the casing unit on the other shall be perfectly smooth.

What I claim as my invention and desire to secure by Letters Patent of the United States is:

1. A pneumatic vehicle wheel tire with a replaceable tread, said tire comprising a casing unit and a tread unit detachably mounted thereon, said tread unit having a smooth inner periphery and consisting of a substantially cylindrical ring of rubber interiorly reinforced in a stratum of the ring near the inner periphery thereof with at least two superposed plies of substantially inextensible filiform reinforcing elements laid substantially parallel to the mid-circumferential plane of the tire whereby the ring is rendered substantially inextensible circumferentially; said casing unit having wheel rim engaging beads at the inner periphery of the unit and carrying on the outer periphery of the unit a smooth seating for the tread unit on which seating the tread unit seats uninterruptedly at all points along its inner periphery, said casing unit having a flattened cross-section when in the non-inflated condition and an external diameter at said seating when in said condition which is substantially equal to the internal diameter of the tread unit, said casing unit comprising a carcass portion consisting of at least one layer of substantially inextensible filiform reinforcing elements laid in the layer in planes which are substantially radial to the tire and contain the rotational axis thereof, said elements of said ring and similarly said elements of said carcass portion being embedded in a matrix of rubber completely separating them from one another, and the arrangement being such that the inflation pressure of the tire is effective to maintain the tread unit in non-slip engagement with the casing unit and by reason of the radial-plane disposition of the reinforcing elements of the casing unit, said casing unit, as regards a layer thereof in the immediate neighbourhood of the tread unit seating, is yieldable longitudinally of said seating so as elastically to move as one with the tread unit as the latter moves relatively to said beads under the working stresses in the tire, thus eliminating all creeping of the tread unit relatively to the casing unit in spite of the absence of any form of anchorage between the two.

2. A pneumatic vehicle wheel tire as specified in claim 1, the tread unit seating being constituted by an annular recess in the periphery of the casing unit, in which recess a portion of the tread unit at the radially inner side thereof is received with a snug fit, the cross-sectional profile of said recess corresponding, in the non-inflated condition of the casing unit, to that of the tread unit as regards said portion thereof which is received within the recess, the rest of the tread unit projecting, at the edges of the unit, beyond the outer surface of the casing unit at the sides of the recess.

3. A pneumatic vehicle wheel tire with a replaceable tread, said tire comprising a casing unit and a tread unit detachably mounted thereon, said tread unit having a smooth inner periphery and consisting of a substantially cylindrical ring of rubber interiorly reinforced in a stratum of the ring near the inner periphery thereof with at least one ply of substantially inextensible filiform reinforming elements laid substantially parallel to the mid-circumferential plane of the tire whereby the ring is rendered substantially inextensible circumferentially, said casing unit having wheel rim engaging beads at the inner periphery of the unit and carrying on the outer periphery of the unit a smooth seating for the tread unit on which seating the tread unit seats uninterruptedly at all points along its inner periphery, said casing unit having a flattened cross-section when in the non-inflated condition and an external diameter at said seating when in said condition which is substantially equal to the internal diameter of the tread unit, said casing unit comprising a carcass portion consisting of at least one layer of substantially inextensible filiform reinforcing elements laid in the layer in planes which are substantially radial to the tire and contain the rotational axis thereof, said elements of said ring and similarly said elements of said carcass portion being embedded in a matrix of rubber completely separating them from one another, and the arrangement being such that the inflation pressure of the tire is effective to maintain the tread unit in non-slip engagement with the casing unit and by reason of the radial-plane disposition of the reinforcing elements of the casing unit, said casing unit, as regards a layer thereof in the immediate neighborhood of the tread unit seating, is yieldable longitudinally of said seating so as elastically to move as one with the tread unit as the latter moves relatively to said beads under the working stresses in the tire.

4. A pneumatic vehicle wheel tire as specified in claim 3, the tread unit seating being constituted by an annular recess in the periphery of the casing unit, in which recess a portion of the tread unit at the radially inner side thereof is received with a snug fit, the cross-sectional profile of said recess corresponding, in the non-inflated condition of the casing unit, to that of the tread unit as regards said portion thereof which is received within the recess, the rest of the tread unit projecting, at the edges of the unit, beyond the outer surface of the casing unit at the sides of the recess.

5. A pneumatic tire with a replaceable tread, said tire comprising a casing unit and a tread unit detachably mounted thereon, said tread unit consisting of a substantially cylindrical ring of rubber interiorly reinforced in a stratum of the ring near the inner periphery thereof with a substantially inextensible reinforcement rendering the ring substantially inextensible circumferentially while leaving it deformable radially, said reinforcement consisting of at least one layer of substantially inextensible reinforcing elements laid substantially parallel to the plane of the tire, said casing unit having wheel rim engaging beads at the inner periphery of the unit and carrying on the outer periphery of the unit a seating for the tread unit, said casing unit having an external diameter which is substantially equal to the internal diameter of the tread unit, said casing unit being interiorly reinforced by a carcass consisting of substantially inextensible reinforcing elements disposed substantially radially of the tire, the substantially radial disposition of said reinforcing elements of the casing unit rendering said seating for the tread unit yieldable longitudinally thereof so as elastically to move with said inner periphery of the tread unit as the latter moves relatively to said beads under the working stresses in the tire.

6. A pneumatic tire with a replaceable tread, said tire comprising a casing unit and a tread unit detachably mounted thereon, said tread unit consisting of a substantially cylindrical ring of rubber interiorly reinforced in a stratum of the ring near the inner periphery thereof with a substantially inextensible reinforcement rendering the ring substantially inextensible circumferentially while leaving it deformable radially, said reinforcement consisting of at least one layer of substantially inextensible filiform reinforcing elements laid substantially parallel to the plane of the tire, said casing unit having wheel rim engaging beads at the inner periphery of the unit and carrying on the outer periphery of the unit a seating for the tread unit, said casing unit having an external diameter which is substantially equal to the internal diameter of the tread unit, said casing unit being interiorly reinforced by a carcass consisting of substantially inextensible reinforcing elements disposed substantially radially of the tire, the substantially radial disposition of said reinforcing elements of the casing unit rendering said seating for the tread unit yieldable longitudinally thereof so as elastically to move with said inner periphery of the tread unit as the latter moves relatively to said beads under the working stresses in the tire.

References Cited in the file of this patent

UNITED STATES PATENTS

| 1,450,800 | Frazier | Apr. 3, 1923 |
| 2,277,145 | Pierce | Mar. 24, 1942 |
| 2,477,754 | Kraft | Aug. 2, 1949 |
| 2,493,614 | Bourdon | Jan. 3, 1950 |
| 2,609,026 | Luchsinger-Caballero | Sept. 2, 1952 |

FOREIGN PATENTS

| 416,082 | France | July 29, 1910 |
| 540,291 | France | Apr. 14, 1922 |